(12) United States Patent

Matsunaka et al.

(10) Patent No.: US 9,315,703 B2
(45) Date of Patent: Apr. 19, 2016

(54) FIXING MEMBER AND METHOD OF MANUFACTURING THE MEMBER, FIXING DEVICE, AND ELECTROPHOTOGRAPHIC IMAGE-FORMING APPARATUS

(71) Applicant: CANON KABUSHIKI KAISHA, Tokyo (JP)

(72) Inventors: Katsuhisa Matsunaka, Inagi (JP); Kazuo Kishino, Yokohama (JP); Katsuya Abe, Tokyo (JP); Takeshi Suzuki, Yokohama (JP); Naoki Akiyama, Toride (JP); Yasuhiro Miyahara, Tokyo (JP); Hiroto Sugimoto, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/726,810

(22) Filed: Jun. 1, 2015

(65) Prior Publication Data

US 2015/0355581 A1   Dec. 10, 2015

(30) Foreign Application Priority Data

Jun. 4, 2014   (JP) ................................ 2014-115844
May 28, 2015  (JP) ................................ 2015-108820

(51) Int. Cl.
*G03G 15/20* (2006.01)
*C09J 183/04* (2006.01)
*B05D 3/02* (2006.01)
*C08K 7/24* (2006.01)

(52) U.S. Cl.
CPC ............. *C09J 183/04* (2013.01); *B05D 3/0272* (2013.01); *C08K 7/24* (2013.01); *G03G 15/2057* (2013.01); *C08K 2201/011* (2013.01); *G03G 2215/2035* (2013.01)

(58) Field of Classification Search
CPC .......................... G03G 15/206; G03G 15/2057
See application file for complete search history.

(56) References Cited

U.S. PATENT DOCUMENTS

| | | | |
|---|---|---|---|
| 5,327,202 A | 7/1994 | Nami et al. | |
| 9,037,062 B2 | 5/2015 | Matsumoto et al. | |
| 2011/0045310 A1* | 2/2011 | Kishino ............ | C08G 73/1042 428/474.4 |
| 2011/0082260 A1* | 4/2011 | Omata ............... | G03G 15/2053 525/276 |
| 2012/0170958 A1* | 7/2012 | Nakajima .......... | G03G 15/2053 399/333 |
| 2013/0259548 A1 | 10/2013 | Matsumoto et al. | |
| 2014/0255067 A1 | 9/2014 | Matsunaka et al. | |
| 2015/0071690 A1 | 3/2015 | Miyahara et al. | |
| 2015/0160596 A1 | 6/2015 | Asaka et al. | |

FOREIGN PATENT DOCUMENTS

JP    2002-268423 A    9/2002
JP    2010-92008 A    4/2010

* cited by examiner

*Primary Examiner* — Sandra Brase
(74) *Attorney, Agent, or Firm* — Fitzpatrick, Cella, Harper & Scinto (57) ABSTRACT

Provided is a fixing member having a silicone rubber elastic layer blended with a carbon nanotube, the fixing member suppressing peeling at an interface in association with insufficient adhesion between a base member and the silicone rubber elastic layer at the time of the use of the fixing member, and hence securing adhesion durability. The fixing member includes a base member, an elastic layer, and a surface layer, in which: the elastic layer contains a silicone rubber and a carbon nanotube; a ratio E200/E50 of an elastic modulus E200 of the elastic layer at 200° C. to an elastic modulus E50 of the elastic layer at 50° C. is 0.5 or more and less than 1.0; an adhesive strength between the elastic layer and the base member is 3.0 N/cm or more and 20.0 N/cm or less; and the elastic layer undergoes a cohesive failure at the time of a peel test.

15 Claims, 4 Drawing Sheets

FIXING MEMBER AND METHOD OF MANUFACTURING THE MEMBER, FIXING DEVICE, AND ELECTROPHOTOGRAPHIC IMAGE-FORMING APPARATUS

BACKGROUND OF THE INVENTION

1. Field of the Invention

The present invention relates to a fixing member to be used in an electrophotographic image-forming apparatus and a method of manufacturing the member. The present invention also relates to a fixing device and an electrophotographic image-forming apparatus.

2. Description of the Related Art

In general, in a heat fixing device to be used in an electrophotographic system such as a copying machine or a laser printer, rotating members such as a pair of rollers, a film and a roller, a belt and a roller, or a belt and a belt, at least one of which has been heated, are brought into press contact with each other.

Then, a recording material (such as paper) holding an image formed with toner in an unfixed state is introduced into a press contact site (fixing nip) formed between the rotating members. At this time, the heated rotating member heats the recording material to melt the toner. Thus, the image is fixed to the recording material.

The rotating member with which the toner image in an unfixed state held on the recording material comes into contact is referred to as "fixing member," and the fixing member is called a fixing roller, a fixing film, a fixing belt, or the like depending on its form.

In association with the fact that an electrophotographic image-forming apparatus has become able to develop a color and to provide improved image quality, in the fixing nip portion, toners of many colors need to be enclosed, and then melted and mixed. Accordingly, there has been used a fixing member having a construction obtained by laminating a base member, an elastic layer containing a silicone rubber or the like formed on the base member, and a release layer excellent in releasability containing a fluorine resin or the like in the stated order.

Incidentally, the fixing member having such construction has heretofore been required to have a high thermal conductivity. To meet such requirement, Japanese Patent Application Laid-Open No. 2002-268423 discloses a fixing belt including a substrate formed of a metal or a resin, an elastic layer formed on the base member, and a release layer formed on the elastic layer, the fixing member being obtained by incorporating carbon fibers into the elastic layer. In addition, Japanese Patent Application Laid-Open No. 2010-92008 discloses a fixing belt including a tubular base member, an elastic layer formed on the outer peripheral side of the base member, and a surface layer formed on the outer peripheral side of the elastic layer, the fixing belt being obtained by incorporating predetermined amounts of a filling agent and a carbon nanotube into the elastic layer.

The present invention is directed to providing a fixing member having the following characteristics and a method of manufacturing the member. An elastic layer containing a carbon nanotube and containing a cured silicone rubber having sufficient elasticity is formed on a base member, and the base member and the elastic layer have sufficient adhesiveness.

The present invention is also directed to providing a fixing device and an electrophotographic image-forming apparatus conducive to stable formation of high-quality electrophotographic images.

SUMMARY OF THE INVENTION

According to one aspect of the present invention, there is provided a fixing member for electrophotography, including: a base member; an elastic layer containing a cured silicone rubber on the base member; and a surface layer on the elastic layer, in which: the elastic layer further contains a carbon nanotube; when an elastic modulus of the elastic layer at 50° C. is defined as E50 and an elastic modulus of the elastic layer at 200° C. is defined as E200, a ratio E200/E50 is 0.5 or more and less than 1.0; a peel adhesive strength between the elastic layer and the base member is 3.0 N/cm or more and 20.0 N/cm or less; and the elastic layer undergoes a cohesive failure in a peel test from the base member.

According to another aspect of the present invention, there is provided a method of manufacturing the fixing member, the method including curing a layer of an addition-curable silicone mixture on a base member, the addition-curable silicone mixture containing: a first silicone compound having, on a side chain thereof, an unsaturated aliphatic group bonded to a silicon atom; a second silicone compound having a hydrogen atom bonded to a silicon atom; a third silicone compound having, at a terminal thereof, an unsaturated aliphatic group bonded to a silicon atom; and a carbon nanotube.

According to further aspect of the present invention, there is provided a fixing device, which is configured to fix an unfixed toner image formed on a recording medium onto the recording medium, the fixing device including: the fixing member; and a pressure member arranged so as to face the fixing member, the pressure member forming a fixing nip with the fixing member.

According to further aspect of the present invention, there is provided an electrophotographic image-forming apparatus, including: an electrophotographic photosensitive member; a charging device configured to charge a surface of the electrophotographic photosensitive member; an exposing unit configured to form an electrostatic latent image on the electrophotographic photosensitive member; an intermediate transfer member; and the fixing device.

Further features of the present invention will become apparent from the following description of exemplary embodiments with reference to the attached drawings.

DESCRIPTION OF THE EMBODIMENTS preferred embodiments of the present invention will now be described in detail in accordance with the accompanying drawings.

The inventors of the present invention have made investigations on the formation of an elastic layer through the curing of a liquid addition-curable silicone mixture containing a carbon nanotube. It should be noted that the liquid addition-curable silicone mixture typically contains, as basic components, a first silicone compound having, in a molecule thereof, an unsaturated aliphatic group bonded to a silicon atom, and a second silicone compound having, in a molecule thereof, a hydrogen atom bonded to a silicon atom. In addition, a silicone rubber is obtained by causing the unsaturated aliphatic group of the first silicone compound and a hydrosilyl group of the second silicone compound to react with each other to cure the mixture.

Then, as a result of the investigations, the inventors have found that the liquid addition-curable silicone mixture obtained by incorporating the carbon nanotube is increased in viscosity by the incorporation of the carbon nanotube, and hence may hinder the formation of an elastic layer having a uniform thickness.

In view of the foregoing, the inventors of the present invention have made investigations on a reduction in molecular weight of the first silicone compound for suppressing the increase in viscosity in association with the addition of the carbon nanotube. In this case, the reduction in molecular weight of the first silicone compound results in a relative reduction in elasticity of the silicone rubber after the curing. To cope with the problem, the inventors of the present invention have attempted to use a compound having an unsaturated aliphatic group introduced into a side chain thereof for sufficiently developing a crosslinked structure in the silicone rubber after the curing upon use of a low-molecular weight compound as the first silicone compound. The inventors have attempted to maintain the elasticity of the elastic layer by causing the unsaturated aliphatic group introduced into a side chain to react with a hydrosilyl group to increase the crosslink density of the cured silicone rubber. As a result, the inventors have found the following new problem: the elasticity of the elastic layer is sufficiently maintained, but adhesion between a base member and the elastic layer becomes insufficient, and hence peeling may occur at an interface between the base member and the elastic layer.

The inventors of the present invention have made investigations on such new problem, and as a result, have obtained a fixing member in which an elastic layer containing a carbon nanotube and containing a cured silicone rubber having sufficient elasticity is formed on a base member, and the base member and the elastic layer have sufficient adhesiveness.

A fixing member according to the present invention includes a base member, an elastic layer containing a cured silicone rubber formed on the base member, and a surface layer formed on the elastic layer, and the elastic layer further contains a carbon nanotube.

In addition, when the elastic modulus of the elastic layer at 50° C. is defined as E50 and the elastic modulus of the elastic layer at 200° C. is defined as E200, a ratio E200/E50 is 0.5 or more and less than 1.0, a peel adhesive strength between the elastic layer and the base member is 3.0 N/cm or more and 20.0 N/cm or less, and the elastic layer undergoes a cohesive failure in a peel test from the base member.

Here, the elastic modulus E50 of the elastic layer at 50° C. is a value assuming that the fixing member is placed in an environment having a relatively low temperature, and is a value at the temperature at which the value hardly varies and hence can be stably measured. In addition, the elastic modulus E200 at 200° C. is a value upon use of the fixing member at the maximum temperature at which no deterioration of the member in association with, for example, the decomposition of the silicone rubber is considered to occur when the member is actually used for heat fixing in an electrophotographic image-forming apparatus. The ratio E200/E50 as a ratio between the elastic moduli at the respective temperatures represents the extent to which the elastic modulus changes when the fixing member undergoes a temperature change from a state in which a fixing device stands by, i.e., the so-called stand-by state to a temperature environment in which the apparatus is actually used. As the value approaches 1.0, the elastic layer can be said to show stable elasticity independent of a temperature in the temperature environment in which the fixing member is actually used. In other words, the value for the ratio E200/E50 can be said to be an indicator of the relative degree of the development of the crosslinked structure of the cured silicone rubber in the elastic layer. Therefore, when a compound having many unsaturated aliphatic groups introduced into side chains thereof is used as the first silicone compound, the crosslink density can be developed, and hence the value for the ratio E200/E50 can be adjusted so as to approach 1.0.

In addition, setting the adhesive strength between the elastic layer and the base member at a temperature of 25° C. to 3.0 N/cm or more and 20.0 N/cm or less can provide the following fixing member: when the fixing member is mounted to a fixing device and subjected to actual use in a state of being pressed, the fixing member has a sufficient adhesive strength.

The inventors of the present invention have made investigations on the reason why the adhesiveness between the elastic layer containing the cured silicone rubber containing the carbon nanotube and the base member reduces to facilitate the occurrence of the interfacial peeling, and have assumed the reason to be as described below.

That is, the base member and the elastic layer containing the cured silicone rubber formed thereon are bonded to each other through a reaction between the unsaturated aliphatic group of the first silicone compound in the addition-curable silicone mixture and a functional group on the surface of the base member. Here, when a silicone compound having an unsaturated aliphatic group introduced into a side chain thereof, the compound being represented by the following formula 1, is used as the first silicone compound having an unsaturated aliphatic group bonded to a silicon atom in the addition-curable silicone mixture, many unsaturated aliphatic groups are close to each other in a molecule of the compound, and hence the carbon nanotube interacts with the unsaturated aliphatic groups to reduce the amount of the unsaturated aliphatic groups that can be involved in the adhesion with the base member.

Formula 1

(In the formula 1, m represents an integer of 0 or more, and n represents an integer of 3 or more.)

Based on the assumption, the inventors of the present invention have made investigations on how to cause an unsaturated aliphatic group that contributes to the formation of a chemical bond with the base member to exist in a film of the liquid addition-curable silicone mixture to be formed on the base member even in the coexistence of the carbon nanotube. As a result, the inventors have found that further incorporating a third silicone compound represented by the following formula 2 in which two or more unsaturated aliphatic groups are separated from each other by a dimethylsiloxane chain into the addition-curable silicone mixture is effective.

Formula 2

(In the formula 2, n represents a positive integer.)

An elastic layer containing a cured silicone rubber formed by forming a layer of the addition-curable silicone mixture further containing the third silicone compound represented by the formula 2 on the base member and curing the layer is excellent in adhesiveness with the base member. As a result, the adhesive strength between the elastic layer and the base member is 3.0 N/cm or more and 20.0 N/cm or less, and when a peel test under conditions to be described later is performed, the elastic layer does not peel at the interface with the base member but undergoes a cohesive failure. The mechanism of action in which enables the securement of the adhesive strength through the use of the third silicone compound has still been unable to be sufficiently elucidated, but the inventors of the present invention have assumed the mechanism of action to be as described below.

That is, it is assumed that in a curing process based on the hydrosilylation reaction of the addition-curable silicone mixture, even when one of the unsaturated aliphatic groups in a molecule of the third silicone compound having an unsaturated aliphatic group at a terminal thereof interacts with a carbon nanotube to be brought into a state of being unable to contribute to the reaction with the base member, the other unsaturated aliphatic group present at a distant position can have molecular mobility in a relatively free manner, and hence can form the chemical bond with the base member. Probably as a result of the foregoing, the following fixing member is obtained: when a peel test is performed between the base member and the elastic layer, the fixing member does not show interfacial peeling (adhesive failure) between the base member and the elastic layer, but shows a sufficient adhesive strength up to the level at which the cohesive failure of the elastic layer occurs.

1. Fixing Member

Next, the fixing member according to the present invention is described in detail below based on a specific construction.

The fixing member according to the present invention is a fixing member for electrophotography, including a base member, an elastic layer, and a surface layer. The elastic layer contains a silicone rubber as a base material and contains a carbon nanotube as a filling agent. A ratio E200/E50 of an elastic modulus E200 of the elastic layer at 200° C. to an elastic modulus E50 thereof at 50° C. is 0.5 or more and less than 1.0. An adhesive strength between the elastic layer and the base member at a temperature of 25° C. is 3.0 N/cm or more and 20.0 N/cm or less. The elastic layer undergoes a cohesive failure at the time of a peel test.

(1) Fixing Member

Figure 1A:
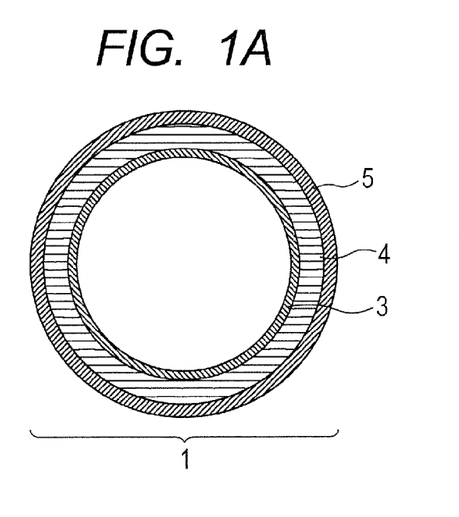
FIG. 1A is a schematic sectional view for illustrating a fixing member according to one embodiment of the present invention.
Figure 1B:
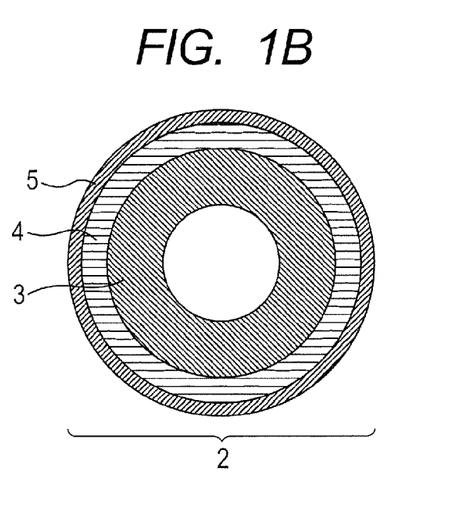
FIG. 1B is a schematic sectional view for illustrating a fixing member according to one embodiment of the present invention.

FIG. 1A and FIG. 1B are each a schematic sectional view for illustrating a fixing member according to one embodiment of the present invention. A belt-shaped fixing member (the so-called fixing belt) is represented by reference symbol 1 and a roller-shaped fixing member (the so-called fixing roller) is represented by reference symbol 2. In general, when the fixing member is used in a state in which a fixing nip is formed by the deformation of the base member itself, the fixing member is referred to as "fixing belt," and when the base member itself is substantially free of deforming and the fixing nip is formed by the elastic deformation of the elastic layer, the fixing member is referred to as "fixing roller."

In each of FIG. 1A and FIG. 1B, the base member is represented by reference symbol 3, the elastic layer covering the peripheral surface of the base member 3 is represented by reference symbol 4, and the surface layer covering the peripheral surface of the elastic layer 4 is represented by reference symbol 5. The surface layer 5 may be fixed to the peripheral surface of the elastic layer 4 by an adhesion layer (not shown).

(2) Base Member

A metal or alloy such as aluminum, iron, stainless steel, or nickel, or a heat-resistant resin such as a polyimide is used as a material for the base member 3.

When the fixing member has a roller shape, a cored bar is used as the base member 3. A material for the cored bar is, for example, a metal or alloy such as aluminum, iron, or stainless steel. In this case, the inside of the cored bar may be hollow as long as the cored bar has a strength enough to resist pressurization in the fixing device. In addition, when the cored bar is hollow, a heat source can be provided in the cored bar.

When the fixing member has a belt shape, examples of the base member 3 include an electrocast nickel sleeve, a stainless-steel sleeve, and a heat-resistant resin belt formed of a polyimide. The inner surface of the base member may be further provided with a layer (not shown) for imparting a function such as wear resistance or a heat insulating property.

The outer surface of the base member 3 may be subjected to surface treatment for imparting a function such as adhesiveness with the elastic layer. Examples of the surface treatment include: physical treatments such as blasting, lapping, and polishing; and chemical treatments such as oxidation treatment, coupling agent treatment, and primer treatment. Two or more kinds of the treatments may be used in combination.

In particular, when a silicone rubber is used as the elastic layer, the primer treatment is generally used as the surface treatment. The primer to be used in this case is in the state of a paint obtained by appropriately blending and dispersing, in an organic solvent, a silane coupling agent, a silicone compound, a hydrogenated methylsiloxane, an alkoxysilane, an acceleration catalyst for a reaction such as hydrolysis, condensation, or addition, a colorant such as red oxide, and the like, which are commercially available. The primer treatment is performed by applying such primer to the surface of the base member (adhesive surface with the elastic layer), and subjecting the primer to processes such as drying and calcination.

The primer can be appropriately selected depending on, for example, the material for the base member, the kind of the elastic layer, and a reaction form at the time of crosslinking. For example, when the elastic layer contains a large amount of an unsaturated aliphatic group, a primer containing a hydrosilyl group is suitably used as the primer in order to impart the adhesiveness through a reaction with the unsaturated aliphatic group. In addition, when the elastic layer contains a large amount of a hydrosilyl group, in contrast, a primer containing an unsaturated aliphatic group is suitably used as the primer. Any other primer except the foregoing such as a primer containing an alkoxy group can be appropriately selected depending on the kinds of the base member as an adherend and the elastic layer.

(3) Elastic Layer

The elastic layer 4 functions as a layer for causing the fixing member to carry such elasticity that the member does not excessively squash toner at the time of fixation and follows the irregularities of the fibers of paper.

In order to express such function, a silicone rubber is used as the base material of the elastic layer 4. Of such silicone rubbers, a cured silicone rubber obtained by curing a liquid addition-curable silicone mixture is preferred. This is because of the following reason: the number of compounds in liquid states is large, and hence a filling agent (filler) can be easily dispersed, and the elasticity of the elastic layer can be adjusted by adjusting its degree of crosslinking depending on the kind and addition amount of the filler to be described later.

A silicone compound having an unsaturated aliphatic group that functions as a crosslinking point at the time of a curing reaction (first silicone compound) is used as the base material of the addition-curable silicone mixture. The addition-curable silicone mixture is obtained by blending the base material with, for example, a silicone compound having a plurality of silicon atom-bonded hydrogen groups (hydrosilyl groups) in a molecule thereof (second silicone compound), a silicone compound having an unsaturated aliphatic group at a terminal of its molecular chain (third silicone compound), and as a filler, a carbon nanotube.

Further, a catalyst for accelerating a hydrosilylation reaction in the addition-curable silicone mixture, and a reaction control agent (inhibitor) called an inhibitor for controlling a reaction start time can be added into the addition-curable silicone mixture. A known substance such as a platinum compound or a rhodium compound is generally used as the catalyst. As the reaction control agent, there are used known substances such as methylvinyltetrasiloxane, an acetylene alcohol, a siloxane-modified acetylene alcohol, and a hydroperoxide.

Further, a silicone rubber composition is obtained by kneading and dispersing a filling agent called a filler such as a carbon nanotube in addition to the foregoing in order to impart thermal conductivity, heat resistance, a reinforcing property, and the like.

The elastic layer can be formed by: causing the outer peripheral surface of the base member to carry the silicone rubber composition thus obtained according to a processing method such as a die molding method, a blade coating method, a nozzle coating method, or a ring coating method; and advancing the crosslinking reaction of the composition according to a method such as heating.

The thickness of the elastic layer can be appropriately designed from the viewpoints of contribution to the surface hardness of the fixing member and the securement of a nip width. In the case that the fixing member has a belt shape, i.e. a fixing belt, the thickness of the elastic layer falls within the range of preferably from 100 μm or more to 500 μm or less, more preferably from 200 μm or more to 400 μm or less. The reason is that the nip width can be secured by the deformation of the base member at the time of the incorporation of the member into the fixing device. In addition, in a heat fixing device, a heater tends to be disposed inside of the fixing belt. In such a case, the elastic layer having the aforementioned thickness hardly suppress a heat transfer from the back side to the surface side of the fixing belt. When the fixing member has a roller shape, it is necessary that the base member be a rigid body and the nip width be formed by the deformation of the elastic layer. Accordingly, the thickness of the elastic layer falls within the range of preferably from 300 μm or more to 10 mm or less, more preferably from 1 mm or more to 5 mm or less.

An adhesive strength between the elastic layer formed on the outer peripheral surface of the base member and the base member is described in detail later.

(3-1) First Silicone Compound (Silicone Compound Having Unsaturated Aliphatic Group)

As described in the foregoing, when the carbon nanotube is blended as the filling agent, the structural viscosity of the silicone rubber composition increases owing to their fibrous shapes. Accordingly, it is important to use a polymer having a relatively low viscosity, i.e., a relatively small molecular weight as the silicone compound having an unsaturated aliphatic group to be used as the base material of the silicone rubber composition. The silicone compound is a polymer compound and hence it is difficult to uniquely specify its molecular weight. However, its construction can be confirmed by using a weight-average molecular weight (Mw) measured by gel permeation chromatography (GPC). Specifically, a compound having a weight-average molecular weight of 150,000 or less is preferred, and a compound having a weight-average molecular weight of 70,000 or less is more preferred. When the molecular weight is larger than such value, the structural viscosity of the silicone rubber composition becomes so large that it becomes remarkably difficult to mold and process the composition.

With regard to an unsaturated aliphatic group to be introduced into such silicone compound, when such group is introduced into a side chain portion $R_2$ as represented by the following formula 3, a large number of such groups can be introduced into one molecule. Accordingly, when the compound is subjected to a crosslinking reaction with a crosslinking agent silicone compound, the elastic layer shows stable elasticity that is hardly influenced by a temperature change.

Formula 3: Structural Formula of Silicone Compound Having Unsaturated Aliphatic Group on Side Chain Thereof Formula 3

(In the formula 3, $R_1$ and $R_2$ are described later, m represents an integer of 0 or more, and n represents an integer of 3 or more.)

In the formula 3, $R_1$ represents a monovalent unsubstituted or substituted hydrocarbon group bonded to a silicon atom excluding an unsaturated aliphatic group. Specific examples thereof include the following:

an alkyl group (e.g., a methyl group, an ethyl group, a propyl group, a butyl group, a pentyl group, or a hexyl group);

an aryl group (e.g., a phenyl group); and a substituted hydrocarbon group (e.g., a chloromethyl group, a 3-chloropropyl group, a 3,3,3-trifluoropropyl group, a 3-cyanopropyl group, or a 3-methoxypropyl group).

In particular, 50% or more of $R_1$'s preferably represent methyl groups and all $R_1$'s particularly preferably represent methyl groups because synthesis and handling are easy, and excellent heat resistance is obtained.

In addition, $R_2$ represents an unsaturated aliphatic group bonded to a silicon atom. Examples thereof include a vinyl group, an allyl group, a 3-butenyl group, a 4-pentenyl group, and a 5-hexenyl group. Of those, a vinyl group is preferred because synthesis and handling are easy and inexpensive, and a crosslinking reaction can be easily performed.

The presence of a silicone compound having vinyl groups in side chain portions thereof can be confirmed by performing hydrogen nuclear measurement (H-NMR) involving using a nuclear magnetic resonance apparatus (NMR). Three hydrogen atoms present in a side chain vinyl group are nonequivalent to one another, and hence mutually undergo spin coupling. Accordingly, peaks assigned to the vinyl groups are separated and detected at 5.74, 5.76, 5.79, 5.80, 5.88, 5.90, 5.92, 5.93, 5.94, 5.98, 5.99, and 6.03 ppm in order of increasing chemical shift, respectively. The peaks separated and detected at such chemical shifts are peculiar to the vinyl groups introduced into the side chain portions of the first silicone compound.

(3-2) Second Silicone Compound

A silicone compound having a plurality of silicon atom-bonded hydrogen groups (hydrosilyl groups) in a molecule thereof can be used as the second silicone compound that functions as a crosslinking agent to be used by being blended into an addition-curable silicone rubber. The crosslinking agent silicone compound has, as a main chain structure, a siloxane structure in which a silicon atom and an oxygen atom are bonded to each other. Any one of a linear skeleton, a branched skeleton, and a cyclic skeleton is permitted as the molecular skeleton of the compound, and a mixture thereof may also be used. The following formula 5 represents an example of a linear crosslinking agent silicone compound, and the following formula 6 represents an example of a cyclic crosslinking silicone compound.

Formula 5

(In the formula 5, $R_1$ is described later, m represents an integer of 0 or more, and n represents an integer of 3 or more.)

Formula 6

(In the formula 6, $R_1$ is described later, m represents an integer of 0 or more, and n represents an integer of 3 or more.)

In the formula 5 and the formula 6, $R_1$ represents a monovalent unsubstituted or substituted hydrocarbon group bonded to a silicon atom and free of an unsaturated aliphatic group as in $R_1$ described in the section of the silicone compound having an unsaturated aliphatic group.

In particular, 50% or more of $R_1$'s preferably represent methyl groups and all $R_1$'s particularly preferably represent methyl groups because synthesis and handling are easy, and excellent heat resistance is obtained.

In the case where all $R_1$'s represent methyl groups, the presence of the second silicone compound having silicon atom-bonded hydrogen groups (hydrosilyl groups) can be confirmed by performing hydrogen nuclear measurement (H-NMR) involving using a nuclear magnetic resonance apparatus (NMR) on the hydrogen atom of a hydrosilyl group. A chemical shift assigned to the hydrogen atom of the hydrosilyl group in this case varies to some extent depending on an environment surrounding the silicon atom to which the hydrogen atom is directly bonded, but its peak appears at a position ranging mainly from 4.65 ppm to 4.70 ppm. The amount of the hydrosilyl groups can be calculated by measuring an integrated value in the portion.

(3-3) Third Silicone Compound

Further, in the present invention, it is important to incorporate, into the liquid addition-curable silicone mixture, a silicone compound having an unsaturated aliphatic group at a terminal of its molecular chain as a component for improving the adhesiveness between the base member and the elastic layer.

It is assumed that the ratio of the unsaturated aliphatic groups introduced into side chain portions in the first silicone compound, the groups being capable of contributing to the adhesion with the base member, reduces owing to their interactions with the carbon nanotube, and hence the adhesive strength reduces.

However, the incorporation of the third silicone compound having an unsaturated aliphatic group at a terminal of its molecular chain can cause an unsaturated aliphatic group that contributes to the formation of a chemical bond with the base member to exist in the layer of the addition-curable silicone mixture formed on the base member. As a result, sufficient adhesiveness between the base member and the elastic layer can be secured.

In the third silicone compound, unsaturated aliphatic groups in a molecule thereof are separated from each other by a dialkylsiloxane chain to be present at positions distant from each other. Accordingly, the probability that the unsaturated aliphatic groups in the molecule simultaneously interact with the carbon nanotube is low, and hence the ratio of the unsaturated aliphatic groups contributing to an adhesion reaction with the base member may increase. As a result, the adhesiveness between the base member and the elastic layer improves, and hence sufficient adhesion durability is obtained.

An unsaturated aliphatic group in the third silicone compound is introduced into a terminal portion $R_2$ of its molecular chain as represented by the following formula 4.

Formula 4

(In the formula 4, $R_1$ and $R_2$ are described later, and n represents a positive integer.)

In the formula 4, the structures of $R_1$ and $R_2$ are identical in meaning to those of $R_1$ and $R_2$ listed for the silicone compound having an unsaturated aliphatic group on a side chain thereof appearing in the formula 3, respectively.

$R_1$ preferably represents a methyl group and $R_2$ preferably represents a vinyl group. n represents a positive integer. Here, a distance between the unsaturated aliphatic groups represented by $R_2$'s positioned at both terminals of a molecule of the compound is determined by the number of n in the formula 4. In addition, in the present invention, the unsaturated aliphatic groups are preferably separated from each other to a sufficient extent so that even when one of the unsaturated aliphatic groups is trapped by an interaction with a carbon nanotube, the molecular mobility of the other unsaturated aliphatic group may not be impaired. Therefore, n in the formula 4 is set to preferably 50 or more, particularly preferably 200 or more. In addition, the number of n in the formula 4 is set to preferably 2,000 or less, particularly preferably 1,000 or less in order to avoid an excessive increase in viscosity of the liquid addition-curable silicone mixture.

The presence of the third silicone compound having vinyl groups as unsaturated aliphatic groups in its terminal portions can also be confirmed by performing hydrogen nuclear measurement (H-NMR) involving using a nuclear magnetic resonance apparatus (NMR) in the same manner as in the foregoing.

Three hydrogen atoms present in a terminal vinyl group are also nonequivalent to one another, and hence mutually undergo spin coupling. However, the chemical shift of a peak appears at a position different from that of a side chain structure. Peaks assigned to the terminal vinyl groups are separated and detected at 5.68, 5.69, 5.73, 5.74, 5.89, 5.90, 5.92, 5.93, 6.06, 6.10, 6.11, and 6.15 ppm in order of increasing chemical shift, respectively. The peaks separated and detected at such chemical shifts are peculiar to the vinyl groups introduced into the terminal portions of the silicone compound.

In the present invention, the ratio (molar fraction) of the terminal unsaturated aliphatic groups of the third silicone compound to the total amount of the unsaturated aliphatic groups in the addition-curable silicone mixture according to the present invention is preferably set to 1% or more and 30% or less. This is because the adhesiveness between the base member and the elastic layer can be additionally improved while the crosslink density of the silicone rubber in the elastic layer and the strength of the elastic layer are sufficiently maintained.

When a vinyl group is used as an unsaturated aliphatic group, the ratio of the terminal vinyl groups to the total amount of the vinyl groups in the silicone rubber composition can be determined by using H-NMR described in the foregoing. The total amount of the vinyl groups is derived by dividing an integrated value at from 5.6 ppm to 6.2 ppm by 3 (because three hydrogen atoms are present in a vinyl group).

The ratio (molar fraction) of hydrosilyl groups in the base polymer composed of the first, second and third silicone compounds with respect to silicon atoms in the base polymer is preferably from 0.3 mol % or more to 10.0 mol % or less, in particular, from 0.5 mol % or more to 4.0 mol % or less.

Further, the ratio (molar fraction) of unsaturated aliphatic groups in the base polymer composed of the first, second and third silicone compounds with respect to silicon atoms in the base polymer is preferably from 0.5 mol % or more to 10.0 mol % or less, in particular, from 0.8 mol % or more to 5.0 mol % or less.

Furthermore, the ratio (mole number of hydrosilyl groups/mole number of unsaturated aliphatic groups) of the amount of hydrosilyl groups in the base polymer with respect to the amount of the unsaturated aliphatic groups is preferably from 0.3 or more to 2.0 or less, in particular, from 0.5 or more to 1.0 or less.

Next, peaks at 6.06, 6.10, 6.11, and 6.15 ppm divided into a quartet by spin coupling between the protons of a terminal vinyl group do not overlap any proton chemical shift of a side chain vinyl group, and hence can be independently detected. Accordingly, an integrated value in the portion is defined as the amount of the terminal vinyl groups. Thus, the ratio of the terminal vinyl groups to the total amount of the vinyl groups can be calculated.

(3-4) Filling Agent (Filler)

The elastic layer contains the carbon nanotube as a filler for imparting thermal conductivity. The carbon nanotube is produced by a production method such as an arc method, a laser ablation method, a direct injection pyrolytic synthesis (DIPS) method, a CoMoCAT method, a HiPCO method, a super-growth CVD method, or a vapor phase epitaxial method, and some carbon nanotubes are commercially available. Of those, a carbon nanotube produced by the vapor phase epitaxial method is particularly preferred from the viewpoints of its shape controllability and dispersibility in a silicone compound.

The carbon nanotube produced by the vapor phase epitaxial method is obtained by: subjecting a hydrocarbon and hydrogen as raw materials in vapor phases to a thermal decomposition reaction in a heating furnace; and growing the resultant in a fibrous shape through the use of a catalyst fine particle as a core. A fiber diameter and a fiber length are controlled by, for example, the kinds, sizes, and compositions of the raw materials and the catalyst, a reaction temperature, an atmospheric pressure, and a time period, and a carbon nanotube whose graphite structure is further developed by heat treatment after the reaction has been known. The resultant fiber has a multilayer structure in its radial direction, and has a shape in which graphite structures are laminated in a tubular manner. The presence of any such graphite structure can be confirmed because the structure shows extremely sharp absorption near from 1,570 $cm^{-1}$ to 1,580 $cm^{-1}$ upon measurement of its Raman spectral luminosity.

The elastic layer may further be blended with any other filler for further imparting thermal conductivity. Specific examples of the filler to be used for imparting thermal conductivity include the following examples:

silicon carbide (SiC); silicon nitride ($Si_3N_4$); boron nitride (BN); aluminum nitride (AlN); alumina ($Al_2O_3$); zinc oxide (ZnO); magnesium oxide (MgO); silica ($SiO_2$); copper (Cu); aluminum (Al); silver (Ag); iron (Fe); nickel (Ni); silicon (Si); and carbon fibers (C).

One kind of those fillers may be used alone, or two or more kinds thereof may be used as a mixture.

The average particle diameter of the heat conductive filler is preferably 1 μm or more and 50 μm or less from the viewpoints of its ease of handling and dispersibility. In addition, a spherical shape, a pulverized shape, a needle-like shape, a plate-like shape, a whisker shape, or the like is used as the shape of the filler. Of those, a spherical shape is preferred from the viewpoint of dispersibility.

In addition, trace amounts of iron oxides (FeO/$Fe_2O_3$/$Fe_3O_4$), titanium oxide ($TiO_2$), carbon black (C), and the like may also be incorporated as the filler for the purpose of imparting properties such as a reinforcing property, heat resistance, processability, and electroconductivity. Further, silica ($SiO_2$) may also be incorporated for this purpose.

The filler is compounded into the addition-curable silicone mixture in the amount needed so that the elastic layer shows a modulus of elasticity (E50, E200) described later. Specifically, suitably adjusting the volume filling ratio of the carbon nanotube within the range of from 0.5 vol % or more to 15 vol % or less with respect to a mixture of the first silicone compound, the second silicone compound, and the third silicone compound (i.e. base polymer) is preferable.

Further, suitably adjusting the volume filling ratio of the other filler, such as an alumina, within the range of from 0 vol % or more to 50 vol % or less, in particular, from 10 vol % or more to 40 vol % or less with respect to a mixture of the first silicone compound, the second silicone compound, and the third silicone compound (i.e. base polymer) is preferable.

(3-5) Re: Elastic Modulus of Elastic Layer

The fixing member is used in a heated state for melting toner, and it is important that a change in elasticity in a temperature region in which the member is used be small from the viewpoint of the stability of the quality of a fixed image. With regard to the foregoing, whether stable elasticity can be secured can be compared and evaluated by measuring the temperature dependence of a change in elastic modulus of the elastic layer in the temperature region in which the fixing member is used.

Specifically, a sample (measuring 50 mm long by 5 mm wide by 2 mm thick) cut out of the elastic layer of the fixing member is prepared. The elastic layer sample is set in a dynamic viscoelasticity-measuring apparatus (DMA) mounted with a heating furnace. After that, an oscillation frequency is set to 10 Hz and measurement is performed while a temperature condition is changed. Thus, an elastic modulus at each temperature can be measured.

In particular, the ratio E200/E50 of the elastic modulus E200 of the elastic layer at 200° C. to the elastic modulus E50 of the elastic layer at 50° C. needs to be 0.5 or more and less than 1.0 in order to secure stable image quality.

Here, the elastic modulus E50 at 50° C. is a value assuming that the fixing member is placed in an environment having a relatively low temperature, and is a value at the temperature at which the value hardly varies and hence can be stably measured.

Meanwhile, the elastic modulus E200 at 200° C. is a value at the highest temperature at which no deterioration of the fixing member in association with, for example, the decomposition of the silicone rubber occurs in a range assumed to be a temperature environment in which the member is actually used.

The ratio "E200/E50" as a ratio between the elastic moduli at the respective temperatures represents the extent to which the elastic modulus changes when the fixing member undergoes a temperature change from a state in which a fixing device stands by, i.e., the so-called stand-by state to a temperature environment in which the apparatus is actually used. As the numerical value approaches 1.0, the elastic layer can be said to show stable elasticity independent of a temperature in the temperature environment in which the fixing member is actually used.

As described in the foregoing, the elastic modulus of the elastic layer after the curing is controlled by changing, for example, the kind, molecular weight, crosslinked structure, and number of crosslinking points of a silicone compound, and the kind and amount of the filler at the stage of the blending of raw materials for the silicone rubber composition.

However, in the addition-curable silicone mixture blended with the carbon nanotube as a filler, a silicone compound having a relatively low molecular weight needs to be used because the structural viscosity of the mixture strongly occurs. At that time, the blending of a large amount of a silicone compound having an unsaturated aliphatic group at a terminal thereof inhibits the development of the branched structure of the cured elastic layer because a branched structure in a base polymer has not developed yet. As a result, the temperature dependence of the elastic modulus in the elastic layer enlarges, and hence the ratio E200/E50 as a ratio between the elastic moduli becomes a value lower than 0.5.

That is, in the elastic layer blended with the carbon nanotube, the temperature dependence of its elastic modulus needs to be reduced by mainly blending a silicone compound having an unsaturated aliphatic group on a side chain thereof as a silicone compound component in the silicone rubber composition to develop branched and crosslinked structures. Here, the phrase "mainly blending" means that the content of the component in terms of a weight is largest among all silicone compound components constituting the silicone rubber composition, and the composition particularly preferably contains the component at 50 wt % or more with respect to all the components.

It should be noted that the elastic moduli E50 and E200 according to the present invention each preferably fall within the range of from 0.5 MPa or more to 4.5 MPa or less as a guideline on flexibility that the elastic layer of the fixing member should have. More specifically, the elastic modulus E50 preferably falls within the range of from 1.7 MPa or more to 4.5 MPa or less, and the elastic modulus E200 preferably falls within the range of from 0.7 MPa or more to 2.8 MPa or less.

In addition, the elastic layer satisfying the following requirements can be said to have elasticity that the elastic layer should have and to be formed of a silicone rubber having a strong crosslinked structure that is hardly broken even at a temperature of 200° C.: each of the values for the elastic moduli E50 and E200 falls within the range, and the ratio E200/E50 is 0.5 or more and less than 1.0.

Incidentally, the elastic layer according to the present invention has a tensile strength (TS) measured by using a dumbbell-shaped #3 specimen based on Japanese Industrial Standard (JIS) K6251:2010 of preferably 0.4 MPa or more and 3.0 MPa or less, particularly preferably 1.0 MPa or more and 2.5 MPa or less. The tensile strength of the elastic layer is mainly dominated by the degree of the crosslinking of the silicone rubber as in its elastic modulus. Therefore, an elastic layer whose elastic moduli E50 and E200 each fall within the numerical range basically has a tensile strength in the range.

(4) Surface Layer

A fluorine resin layer formed of, for example, any one or a combination of the resins listed below is mainly used as the surface layer 5. A tetrafluoroethylene-perfluoro(alkyl vinyl ether) copolymer (PFA), polytetrafluoroethylene (PTFE), a tetrafluoroethylene-hexafluoropropylene copolymer (FEP), and the like.

Of the materials listed above, PFA is preferred from the viewpoints of moldability and toner releasability.

A method for the formation of the layer is not particularly limited. Examples thereof include: a method involving covering the top of the elastic layer 4 with a resin molded into a tubular shape through an adhesion layer (not shown); and a method involving directly coating the surface of the elastic layer with a fine particle of a fluorine resin or coating the surface with a paint obtained by dispersing the fine particles in a solvent, and then drying and melting the fine particles to bake the fine particles to the surface.

In addition, a filler may be incorporated into the surface layer for controlling its thermal properties to the extent that none of the moldability and the releasability is impaired.

The thickness of the surface layer is set to preferably 50 μm or less, more preferably 30 μm or less. This is because the elasticity of the elastic layer upon lamination of the surface layer can be maintained, and the surface hardness of the fixing member can be suppressed from becoming excessively high.

(5) Re: Adhesive Strength Between Base Member and Elastic Layer, and Peel Test

The adhesive strength between the base member and the elastic layer at 25° C. is 3.0 N/cm or more and 20.0 N/cm or less. In the present invention, the adhesive strength between the base member and the elastic layer is measured by an "Adhesive-Peel Adhesive Strength Test Method" (JIS K6854-1:1999) specified by Japanese Industrial Standards.

A specific method of measuring the adhesive strength is described with reference to FIG. 2. A core 12 is inserted into a fixing member 11 (a belt-shaped fixing member, i.e., a fixing belt in FIG. 2) as required so that the shape of the base member of the fixing member may not deform, and a slit having a width of 1 cm is made along the circumferential direction of the fixing member with a razor so as to reach from an elastic layer side to the surface of the base member. Next, a notch is made at one site in the portion having made therein the slit in the lengthwise direction of the fixing member. A surface layer is forcedly peeled from an interface portion between the elastic layer and the base member with a razor in the circumferential direction by about 2 cm, and a tip portion of the peeled portion is interposed into a chuck portion 14 of a force gauge 13. It should be noted that when the surface layer is so thin that its plastic deformation occurs, the following procedure may be adopted: a polyimide tape for reinforcement is attached to the surface of the surface layer prior to the formation of the slit, and the slit is formed from above the tape. Thus, the plastic deformation of the surface layer can be suppressed.

Then, the core 12 (or the base member) is fixed so that the fixing member can freely rotate in the circumferential direction, and the force gauge 13 is pulled up with a unit (not shown) in a direction vertical to the tangential direction of the main body of the fixing member at the root of the peeled end at a velocity of 50 mm/min until the length of the peeled layer on the elastic layer side becomes 50 mm. The length is also referred to as "a peel length". At this time, it is important that a direction F in which the layer is peeled maintain an angle of 90° relative to the tangential direction of the main body of the fixing member at the root of the peeled end. In order to maintain an angle of 90°, first, the peeled end is interposed into the force gauge so that the peeled layer on the elastic layer side may form an angle of 90° relative to the tangential direction. Next, the force gauge is pulled from directly above the rotation axis of the core 12 in the vertical direction F at 50 mm/min, and at the same time, the core 12 is rotated in a direction indicated by R in the figure so that the moving velocity of the core 12 in the tangent may be equal to the moving velocity in the vertical direction F. Specifically, when the outer diameter of the fixing belt is 30 mm, the angle of the direction in which the layer is peeled can be maintained at 90° relative to the tangential direction of the main body of the fixing member by setting the rotational speed of the core to 0.53 rpm.

A force-chucking movement distance curve over a peel length of 50 mm is obtained by the foregoing measurement. Then, the arithmetic average of peel forces is determined from the force-chucking movement distance curve. The value is defined as a "peel force" at one measurement site. Here, forces measured at a chucking movement distance interval of 0.1 mm were used in the calculation of the arithmetic average of the peel forces.

It should be noted that with regard to an adhesive strength in each of Examples and Comparative Examples to be described later, the peel test was performed on a fixing member according to each of Examples and Comparative Examples at five arbitrary sites at which the results of the measurement did not interfere with one another. Then, the arithmetic average of "peel forces" determined from the results of the measurement at the five sites was defined as the "peel force" of the fixing member according to each of Examples and Comparative Examples. In addition, in the case of such a fixing member that a peel length of 50 mm could not be obtained in the peel test at one site, a force-chucking movement distance curve was created by performing the peel test at a plurality of sites so that a total peel length became 250 mm. An average peel force was determined from the force-chucking movement distance curve, and the value was defined as the "peel force" of the fixing member.

In addition, a fracture surface formed by the peel test is judged in accordance with an "Adhesive-Name of Main Failure Mode" (JIS K6866:1999) specified by Japanese Industrial Standards. Then, a state in which a fractured elastic layer adheres to an entire surface on a base member side is judged as the cohesive failure (CF) of the elastic layer.

On the other hand, the case where no elastic layer adheres to the surface on the base member side is regarded as an adhesive failure (interfacial peeling).

In addition, when the elastic layer adheres to part of the surface on the base member side, the case where the coverage of the fractured elastic layer with respect to the peeled area of the elastic layer in the base member is 50% or more is judged as the cohesive failure of the elastic layer. In addition, the case where the coverage of the fractured elastic layer with respect to the peeled area of the elastic layer in the base member is less than 50% is judged as the adhesive failure (interfacial peeling).

2. Fixing Device

A fixing device according to the present invention includes the above-mentioned fixing member. In the fixing device, rotating members such as a pair of rollers, a film and a roller, a belt and a roller, or a belt and a belt, at least one of which has been heated, are brought into press contact with each other. Those rotating members are appropriately selected in consideration of conditions such as the process speed and size of an entire image-forming apparatus. Here, specific examples of the fixing device are given, and their constructions are described.

(1) Fixing Device Using Belt-Shaped Fixing Member

Figure 3:
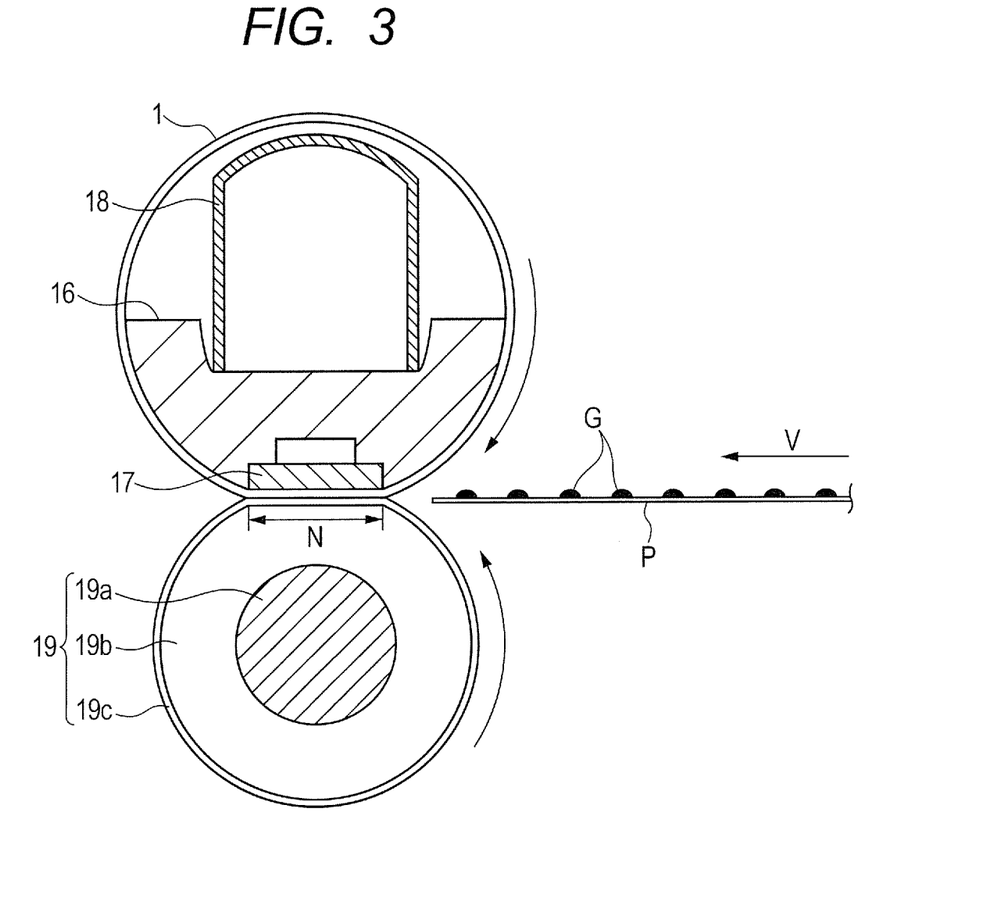
FIG. 3 is a schematic transverse sectional view for illustrating a construction in an example of a fixing device according to the present invention using a belt-shaped fixing member.

Illustrated in FIG. 3 is a schematic transverse sectional view in an example of a fixing device using a belt-shaped fixing member.

In the fixing device, the fixing belt 1 is a seamless-shaped (endless-shaped) belt as the fixing member according to the present invention. A belt guide member 16 molded out of a resin having heat resistance and a heat-insulating property is placed for holding the fixing belt 1.

A ceramic heater 17 as a heat source is formed at the position at which the belt guide member 16 and the inner surface of the fixing belt 1 are brought into contact with each other.

The ceramic heater 17 is fixed and supported by being fit into a groove portion molded and formed along the lengthwise direction of the belt guide member 16 (rotation axis direction of the fixing belt 1). The ceramic heater 17 is electrified by a unit (not shown) to generate heat.

The seamless-shaped fixing belt 1 is loosely fit onto the belt guide member 16. A pressurizing rigid stay 18 is inserted into the belt guide member 16.

An elastic pressure roller 19 as a pressure member is obtained by forming a silicone rubber elastic layer 19b on a stainless cored bar 19a to reduce its surface hardness.

Both end portions of the cored bar 19a are formed while being held with bearings so that the cored bar 19a may freely rotate between chassis side plates (not shown) on a front side and a back side.

The elastic pressure roller 19 is covered with a fluorine resin tube having a thickness of 50 μm as a surface layer 19c for improving its surface property and releasability.

A depressing force (force in a downward direction in FIG. 3) is applied to the pressurizing rigid stay 18 by placing a pressure spring (not shown) between each of both end portions of the pressurizing rigid stay 18 and a spring bearing member (not shown) on an apparatus chassis side in a contracted manner. Thus, the lower surface of the ceramic heater 17 formed on the lower surface of the belt guide member 16 and the upper surface of the elastic pressure roller 19 are brought into press contact with other with the fixing belt 1 sandwiched therebetween to form a fixing nip N having a predetermined width.

A recording medium P serving as a body to be heated, the recording medium having formed thereon images with an unfixed toner G, is interposed and conveyed into the fixing nip N at a conveying velocity V. Thus, the toner images are heated and pressed. As a result, the toner images are melted and mixed, and then cooled, whereby the toner images are fixed onto the recording medium P.

It should be noted that in the fixing device according to an embodiment illustrated in FIG. 3, the elastic pressure roller 19 rotates in a counterclockwise direction by being rotationally driven by a driving portion (not shown). Then, the fixing belt 1 abutting with the elastic pressure roller 19 at the fixing nip N rotates in a clockwise direction following the rotation of the roller.

(2) Fixing Device Using Roller-Shaped Fixing Member

Figure 4:
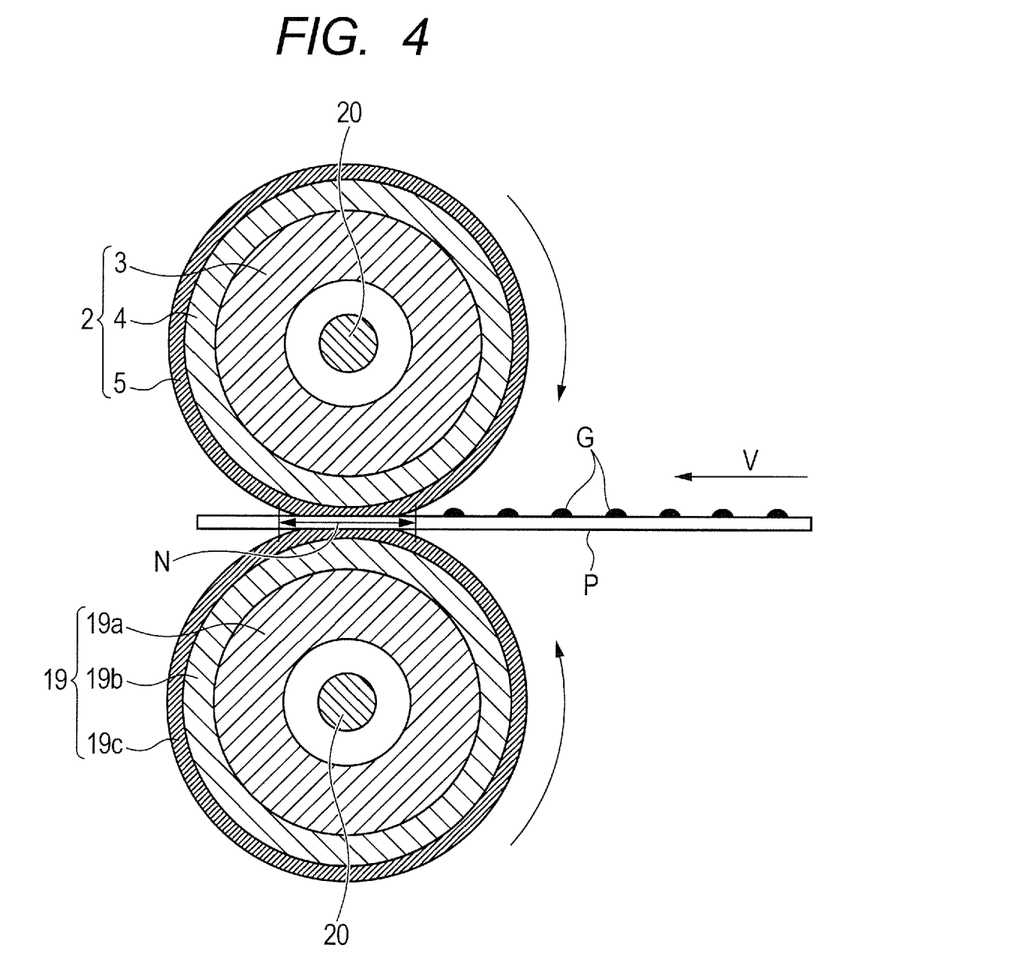
FIG. 4 is a schematic transverse sectional view for illustrating a construction in an example of the fixing device according to the present invention using a roller-shaped fixing member.

Illustrated in FIG. 4 is a schematic transverse sectional view in an example of a fixing device using a roller-shaped fixing member.

In the fixing device, the fixing roller 2 is the fixing member according to the present invention. The fixing roller 2 has the elastic layer 4 formed on the outer peripheral surface of the base member 3, and has the surface layer 5 formed outside the layer. In addition, the elastic pressure roller 19 has the elastic layer 19b formed on the outer peripheral surface of the cored bar 19a, and has the surface layer 19c formed outside the layer.

The elastic pressure roller 19 as a pressure member is placed so as to face the fixing roller 2, and the two rollers are rotatably pressed against each other by a pressure unit (not shown) to form the fixing nip N. It should be noted that the pressure unit may press one of the two rollers in a direction toward the other roller that has been fixed, or may press the two rollers in the direction in which the rollers face each other.

The inside of each of the fixing roller 2 and the elastic pressure roller 19 is hollow. A heater 20 as a heat source that supplies heat needed for melting the unfixed toner G is installed in the hollow inside. A halogen heater is generally used as the heater 20. A plurality of halogen heaters may be installed in the inside depending on the size of the recording medium P to be conveyed.

A rotating force is applied to at least one of the fixing roller 2 and the elastic pressure roller 19 by a unit (not shown) through the end portions of the base member 3 and the cored bar 19a, respectively, and rotation is controlled so that the moving velocity of the surface of the fixing roller 2 may be substantially equal to the conveying velocity V of the recording medium P. At this time, a rotating force may be applied to one of the fixing roller 2 and the elastic pressure roller 19, and the other may rotate following the rotation of the one, or rotating forces may be applied to both of the rollers.

The recording medium P having formed thereon images with the unfixed toner G is interposed and conveyed into the fixing nip N of the fixing device thus formed. Thus, the unfixed toner images are heated and pressed. As a result, the toner images are melted and mixed, and then cooled, whereby the toner images are fixed onto the recording medium P.

3. Electrophotographic Image-Forming Apparatus

An electrophotographic image-forming apparatus according to the present invention is, for example, a compound machine, copying machine, facsimile, or printer employing an electrophotographic system. Here, the outline of the entire construction of the image-forming apparatus of the present invention is described by taking a color laser printer as an example.

Figure 5:
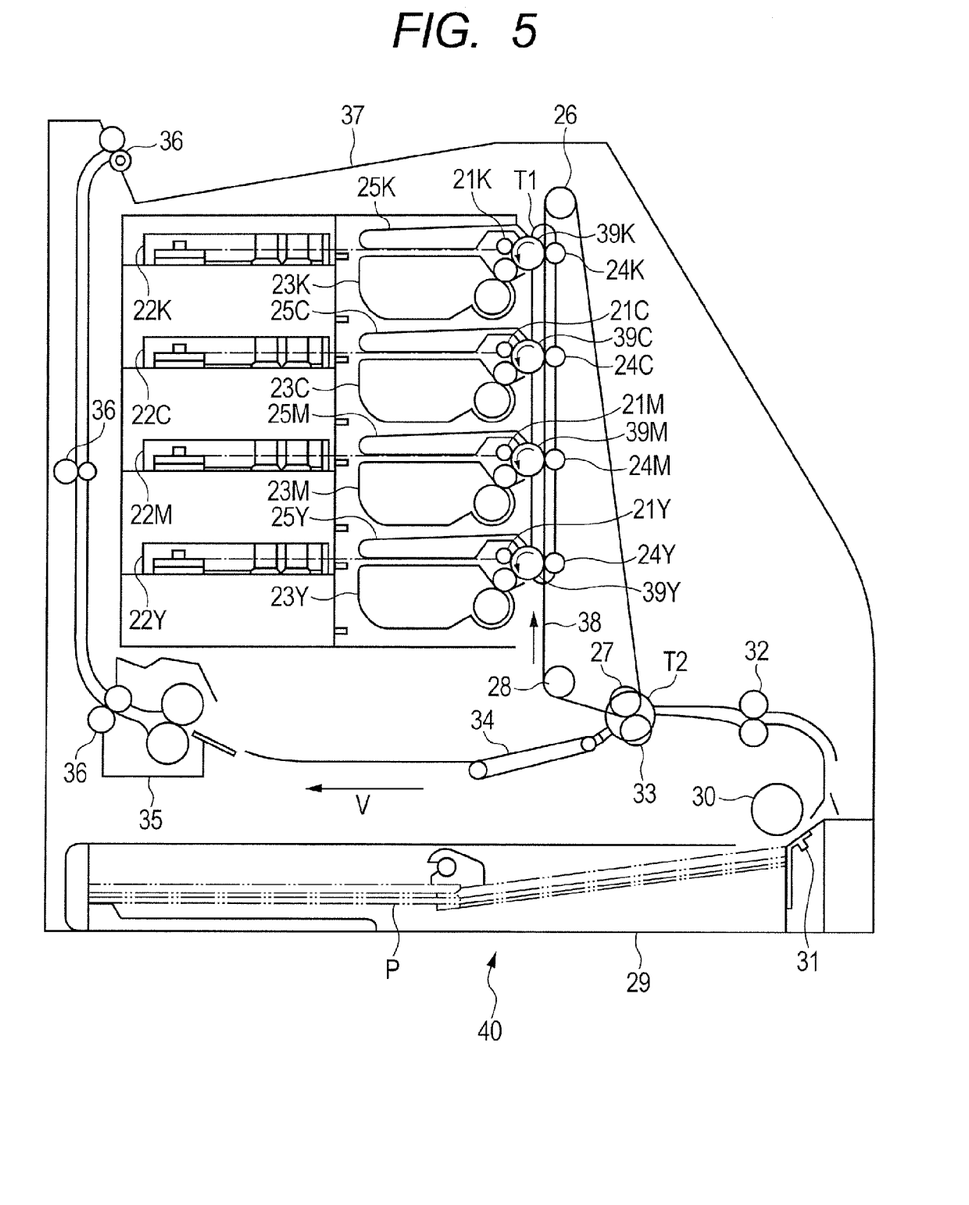
FIG. 5 is a schematic sectional view for illustrating the construction of a color laser printer as an electrophotographic image-forming apparatus according to one embodiment of the present invention.

FIG. 5 is a schematic sectional view of a color laser printer as an electrophotographic image-forming apparatus according to one embodiment of the present invention. A color laser printer (hereinafter referred to as "printer") 40 illustrated in FIG. 5 includes an electrophotographic image-forming portion including a drum-shaped electrophotographic photosensitive member (hereinafter referred to as "photosensitive drum") that rotates at a constant speed for each of yellow (Y), magenta (M), cyan (C), and black (K) colors. In addition, the printer includes an intermediate transfer member 38 for holding color images developed and subjected to multilayer transfer in the electrophotographic image-forming portions, and further transferring the color images onto the recording medium P fed from a feeding portion. The photosensitive drums 39 (39Y, 39M, 39C, 39K) as the electrophotographic photosensitive members are each rotationally driven counterclockwise by a driving unit (not shown) as illustrated in FIG. 5.

Around each of the photosensitive drums 39, a charging device 21 (21Y, 21M, 21C, 21K) that uniformly charges the surface of the photosensitive drum 39, a scanner unit 22 (22Y, 22M, 22C, 22K) as an exposing unit that irradiates the photosensitive drum 39 with a laser beam based on image information to form an electrostatic latent image thereon, a developing unit 23 (23Y, 23M, 23C, 23K) that causes toner to adhere to the electrostatic latent image to develop the image as a toner image, a primary transfer roller 24 (24Y, 24M, 24C, 24K) that transfers the toner image on the photosensitive drum 39 onto the intermediate transfer member 38 at a primary transfer portion T1, and a cleaning unit 25 (25Y, 25M, 25C, 25K) including a cleaning blade that removes transfer residual toner remaining on the surface of the photosensitive drum 39 after the transfer are arranged in the stated order along the rotation direction of the drum.

Upon image formation, the belt-shaped intermediate transfer member 38 suspended over rollers 26, 27, and 28 rotates, and the respective color toner images formed on the respective photosensitive drums 39 are subjected to primary transfer onto the intermediate transfer member 38 in a superimposed manner, whereby a color image is formed.

The recording medium P is conveyed to a secondary transfer portion T2 by a conveying unit in synchronization with the primary transfer onto the intermediate transfer member 38. The conveying unit includes a feeding cassette 29 storing the multiple recording media P, a feeding roller 30, a separating pad 31, and a registration roller pair 32. At the time of the image formation, the feeding roller 30 is rotationally driven according to an image-forming operation, the recording media P in the feeding cassette 29 are separated one by one, and the recording medium P is conveyed to the secondary transfer portion T2 by the registration roller pair 32 in timing with the image-forming operation.

A movable secondary transfer roller 33 is arranged in the secondary transfer portion T2. The secondary transfer roller 33 can move in a substantially vertical direction. In addition, upon image transfer, the secondary transfer roller 33 is pressed against the intermediate transfer member 38 through the recording medium P at a predetermined pressure. At the same time with the foregoing, a bias is applied to the secondary transfer roller 33 and hence the toner images on the intermediate transfer member 38 are transferred onto the recording medium P.

The intermediate transfer member 38 and the secondary transfer roller 33 are each driven. Accordingly, the recording medium P in a state of being sandwiched between the member and the roller is conveyed at a predetermined speed V in a leftward direction illustrated in FIG. 5, and the recording medium P is conveyed to a fixing portion 35 as a next step by a conveying belt 34. The fixing portion 35 is the fixing device of the present invention. In the fixing portion 35, heat and a pressure are applied to fix the transferred toner images onto the recording medium. The recording medium P is discharged onto a discharge tray 37 on the upper surface of the electrophotographic image-forming apparatus 40 by a discharge roller pair 36.

According to the present invention, adhesiveness between a base member and an elastic layer can be secured even in a fixing member improved in thermal conductivity by blending a carbon nanotube into the elastic layer. Accordingly, there can be obtained a fixing member suppressing interfacial peeling between a base member and an elastic layer in an environment in which the fixing member is actually used, and hence having sufficient durability.

EXAMPLES

Now, the present invention is more specifically described by way of Examples.

<Preparation of Base Polymer 1>

With regard to a base polymer 1, first, a silicone compound represented by the structural formula of the formula 1 into the side chain portions of which vinyl groups had been introduced in an amount of 1.2% with respect to silicon atoms was prepared as a silicone compound having an unsaturated aliphatic group on a side chain thereof (the first silicone compound, hereinafter sometimes referred to as "Si-1").

Next, a silicone compound represented by the structural formula of the formula 2 into the terminal portions of which vinyl groups had been introduced in an amount of 0.8% with respect to silicon atoms was prepared as a silicone compound having an unsaturated aliphatic group at a terminal thereof (the third silicone compound, hereinafter sometimes referred to as "Si-3").

Further, a silicone compound in which $R_1$ of the structural formula of the formula 5 represented a methyl group, and into which hydrosilyl groups had been introduced in an amount of 19.5% with respect to silicon atoms was prepared as a crosslinking agent silicone compound (the second silicone compound, hereinafter sometimes referred to as "Si-2").

Those compounds were weighed at a blending ratio shown in Table 1. Further, trace amounts of a hydrosilylation catalyst (platinum catalyst: platinum carbonyl cyclovinylmethylsiloxane complex) and an inhibitor were added to the compounds, and the contents were sufficiently mixed to provide the base polymer 1. The average molecular weights and functional group introduction amounts of the respective silicone compounds, and their blending ratio are shown in Table 1.

A weight-average molecular weight (Mw) was measured by using: a product obtained by sequentially setting columns (trade names: Shodex K-800D×1, Shodex K-805L×2; both manufactured by Showa Denko K.K.) in a gel permeation chromatography analyzer (GPC) having a refractive index detector (RI) as a detector (trade name: SC-8010 System; manufactured by Tosoh Corporation); and chloroform ($CHCl_3$) as an eluent. A GPC calibration curve representing a relationship between a molecular weight and a retention time was created by using a plurality of kinds of polydimethylsiloxanes having known molecular weights in advance, and then the average molecular weight (Mw) was calculated from the elution curve of a silicone compound used this time.

A functional group introduction amount was measured with a nuclear magnetic resonance apparatus (trade name: FT-NMR AL400; manufactured by JEOL Ltd.). Terminal and side chain unsaturated aliphatic group amounts, and a hydrosilyl group amount were determined and calculated from chemical shifts according to a hydrogen nuclear measurement (H-NMR) mode by using heavy chloroform ($CDCl_3$) as a solvent and a proton ($^1H$) as an observation nucleus.

<Preparation of Base Polymers 2 to 7>

Base polymers 2 to 7 were each prepared in the same manner as in the base polymer 1 except that silicone compounds whose weight-average molecular weights, unsaturated aliphatic group amounts, and hydrosilyl group amounts took values shown in Table 1 were mixed as the Si-1, the Si-2, and the Si-3 at a blending ratio shown in Table 1.

TABLE 1

|  |  | Weight-average molecular weight (Mw) | Unsaturated aliphatic group amount (% with respect to silicon atoms) | Hydrosilyl group amount (% with respect to silicon atoms) | Blending ratio (mass %) | Ratio of terminal unsaturated aliphatic groups to total amount of unsaturated aliphatic groups (%) |
|---|---|---|---|---|---|---|
| Base polymer 1 | Si-1 | 28,000 | 1.2 | — | 70 | 20 |
|  | Si-3 | 28,000 | 0.8 | — | 27 |  |
|  | Si-2 | 2,000 | — | 19.5 | 3 |  |
| Base polymer 2 | Si-1 | 28,000 | 1.2 | — | 72 | 10 |
|  | Si-3 | 62,700 | 0.4 | — | 25 |  |
|  | Si-2 | 2,000 | — | 19.5 | 3 |  |
| Base polymer 3 | Si-1 | 28,000 | 5.2 | — | 75 | 1 |
|  | Si-3 | 62,700 | 0.4 | — | 10 |  |
|  | Si-2 | 2,000 | — | 19.5 | 15 |  |
| Base polymer 4 | Si-1 | 28,000 | 1.2 | — | 76 | 30 |
|  | Si-3 | 6,000 | 3.0 | — | 13 |  |
|  | Si-2 | 2,000 | — | 5.9 | 11 |  |

TABLE 1-continued

|  |  | Weight-average molecular weight (Mw) | Unsaturated aliphatic group amount (% with respect to silicon atoms) | Hydrosilyl group amount (% with respect to silicon atoms) | Blending ratio (mass %) | Ratio of terminal unsaturated aliphatic groups to total amount of unsaturated aliphatic groups (%) |
|---|---|---|---|---|---|---|
| Base polymer 5 | Si-1 | 28,000 | 5.2 | — | 80 | 7 |
|  | Si-3 | 6,000 | 3.0 | — | 10 |  |
|  | Si-2 | 2,000 | — | 35.7 | 10 |  |
| Base polymer 6 | Si-1 | 28,000 | 1.2 | — | 97 | 0 |
|  | Si-2 | 2,000 | — | 19.5 | 3 |  |
| Base polymer 7 | Si-3 | 6,000 | 3.0 | — | 90 | 100 |
|  | Si-2 | 2,000 | — | 19.5 | 10 |  |

Example 1-1

A carbon nanotube (trade name: VGCF; manufactured by Showa Denko K.K., average fiber diameter: 150 nm, average fiber length: 8 μm) was added as a heat conductive filler at a volume filling ratio of 2.0% to the base polymer 1. Further, alumina (trade name: ALUNABEADS CB-A20S; manufactured by Showa Denko K.K., average particle diameter: 21 μm) was added at a volume filling ratio of 35.0% to the mixture, and the contents were sufficiently mixed to provide a silicone rubber composition 1.

Next, a nickel electrocast endless sleeve having an inner diameter of 30 mm, a length of 400 mm, and a thickness of 40 μm was prepared as a base member. It should be noted that in a series of production steps, the endless sleeve (endless-shaped sleeve) was handled while a core was inserted into the sleeve.

First, a primer (trade name: DY39-051A/B; manufactured by Dow Corning Toray Co., Ltd.) was applied to the outer peripheral surface of the base member in a substantially uniform manner so that its dry weight became 30 mg. After the solvent had been dried, baking treatment was performed in an electric furnace set to 160° C. for 30 minutes.

The silicone rubber composition 1 was applied onto the base member subjected to the primer treatment by a ring coating method so as to have a thickness of 300 μm. The silicone rubber was cured by heating the resultant endless belt in an electric furnace set to 200° C. for 4 hours. Thus, an elastic layer was obtained.

The elastic layer was irradiated with UV light from a UV lamp placed at a distance of 10 mm from the surface of the endless belt while the surface was rotated in a circumferential direction at a moving velocity of 20 mm/sec. The irradiation was performed by using a low-pressure mercury UV lamp (trade name: GLQ500US/11; manufactured by Toshiba Lighting & Technology Corporation (former Harison Toshiba Lighting Corporation)) as the UV lamp in an atmosphere at 100° C. for 5 minutes.

After cooling to room temperature, an addition-curable silicone rubber adhesive (trade name: SE1819CV A/B; manufactured by Dow Corning Toray Co., Ltd.) was applied to the surface of the elastic layer of the endless belt in a substantially uniform manner so as to have a thickness of about 20 μm.

Next, a fluorine resin tube having an inner diameter of 29 mm and a thickness of 20 μm (trade name: KURANFLON-LT; manufactured by Kurabo Industries Ltd.) was laminated. After that, the excess adhesive was squeezed out of a space between the elastic layer and the fluorine resin tube by uniformly squeezing the surface of the belt from above the fluorine resin tube so that the thickness of the adhesive became sufficiently small.

The fluorine resin tube (a surface layer) was fixed onto the elastic layer by heating the endless belt in an electric furnace set to 200° C. for 1 hour to cure the adhesive. Both end portions of the resultant endless belt were cut. Thus, a fixing belt 1 having a width of 341 mm was obtained.

The elastic layer measuring 50 mm long by 5 mm wide by 200 μm thick was cut out of the fixing belt 1 and set in the tensile measurement attachment of a dynamic viscoelasticity-measuring apparatus (trade name: Rheogel-E4000; manufactured by UBM), and its elastic moduli at 50° C. and 200° C. were measured at an oscillation frequency of 10 Hz.

Figure 2:
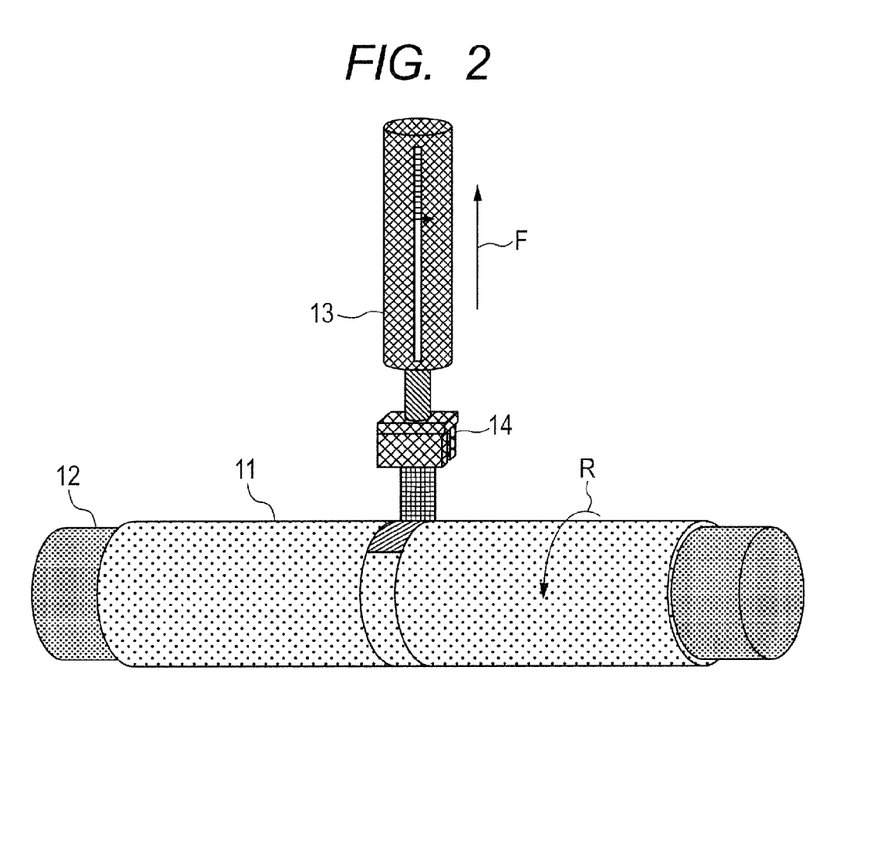
FIG. 2 is a schematic view for illustrating a method of measuring an adhesive strength to be employed in the present invention.

In addition, according to the method described in the foregoing, the fixing belt 1 was set as illustrated in FIG. 2, a peel test between the base member and the elastic layer was performed, and the measurement of an adhesive strength (peel strength) between the base member and the elastic layer with a force gauge (trade name: Digital Force Gauge FGX-5; manufactured by Nidec-Shimpo Corporation), and the observation of a fracture surface were performed. The respective results are shown in Table 3.

Examples 1-2 to 1-5, and Comparative Examples 1-1 and 1-2

Silicone rubber compositions 2 to 7 were each prepared in the same manner as in the silicone rubber composition 1 according to Example 1 except that the base polymer 1 was changed to any one of the base polymers 2 to 7. Then, fixing belts 2 to 7 were each produced in the same manner as in Example 1 except that any one of the silicone rubber compositions 2 to 7 was used in the formation of the elastic layer, and the belts were evaluated in the same manner as in Example 1-1.

In addition, a dumbbell-shaped #3 specimen for tensile strength measurement was produced in the same manner as in Example 1-1 except that any one of the silicone rubber compositions 2 to 7 was used, and its tensile strength was measured.

The results of the measurement are shown in Table 2 and Table 3.

TABLE 2

|  | Fixing belt No. | Base polymer No. | Physical property of elastic layer at 50° C. Elastic modulus E50 (MPa) | Physical property of elastic layer at 200° C. Elastic modulus E200 (MPa) | Elastic modulus ratio E200/E50 |
|---|---|---|---|---|---|
| Example | 1-1 | 1 | 1 | 1.7 | 0.9 | 0.53 |
|  | 1-2 | 2 | 2 | 1.2 | 0.7 | 0.58 |
|  | 1-3 | 3 | 3 | 3.4 | 2.5 | 0.74 |
|  | 1-4 | 4 | 4 | 2.0 | 1.0 | 0.50 |
|  | 1-5 | 5 | 5 | 4.4 | 2.8 | 0.64 |
| Comparative Example | 1-1 | 6 | 6 | 1.6 | 1.4 | 0.88 |
|  | 1-2 | 7 | 7 | 3.2 | 1.1 | 0.34 |

TABLE 3

|  |  | Peel strength between base member and elastic layer (N/cm) | Failure morphology of fracture surface |
|---|---|---|---|
| Example | 1-1 | 6.8 | Cohesive failure of elastic layer |
|  | 1-2 | 3.0 | Cohesive failure of elastic layer |
|  | 1-3 | 12.0 | Cohesive failure of elastic layer |
|  | 1-4 | 8.3 | Cohesive failure of elastic layer |
|  | 1-5 | 14.3 | Cohesive failure of elastic layer |
| Comparative Example | 1-1 | 1.1 | Adhesive failure (interfacial peeling) between base member and elastic layer |
|  | 1-2 | 9.1 | Cohesive failure of elastic layer |

Example 2-1

The fixing belt 1 according to this example was produced by the method described in Example 1-1. The fixing belt 1 was mounted to the fixing device unit of a color laser printer (trade name: Satera LBP5910; manufactured by Canon Inc.) while an applied pressure was set to 32 kgf.

The fixing device unit was mounted to the color laser printer. The image quality stability test of an electrophotographic image and a durability test to be described later were performed with the color laser printer.

Evaluation methods for the image quality stability test and the durability test are as described below.

(Evaluation Method for Image Quality Stability Test)

An image for an image quality stability evaluation is continuously fixed onto 100 sheets of paper by using the color laser printer mounted with the fixing belt in an environment having a temperature of 10° C. and a humidity of 50% at an input voltage of 100 V. Used as the paper is A4 size recycled paper (trade name: Recycled Paper GF-R100; manufactured by Canon Inc., thickness: 92 μm, basis weight: 66 g/m², used paper blending ratio: 70%, Bekk smoothness: seconds (measured by a method in conformity with JIS P8119)).

The image for an image quality stability evaluation is an image obtained by placing the color chart with an image identification number S6 of a "High-definition Color Digital Standard Image (XYZ/SCID)" (JIS X9204:2004) specified by Japanese Industrial Standards near the central portion of the surface of the paper.

The melting and mixing states of toners in a first image obtained at this time, and those in a 100-th image obtained at this time were compared, and a sensory evaluation for a change in hue was performed by five subjects. The results of the evaluation are shown in accordance with judgement criteria shown in Table 4 below.

In this test, the quality of the image for an image quality stability evaluation on the 100-th sheet fixed with such fixing member that heat has been accumulated in its elastic layer by the continuous fixation of the image for an image quality stability evaluation on the 100 sheets is compared to the quality of the image for an image quality stability evaluation on the first sheet.

When the development of a crosslinked structure in the elastic layer is not sufficient, as the elastic layer is heated in association with the use of the fixing member, heat is accumulated in the elastic layer to reduce the elastic modulus of the elastic layer. As a result, the image for an image quality stability evaluation on the first sheet and the image for an image quality stability evaluation on the 100-th sheet fixed with the fixing member whose elastic layer has been reduced in elastic modulus differ from each other in quality. That is, this evaluation is performed for evaluating an influence of the degree of the development of the crosslinked structure of the elastic layer on the temperature dependence of the elastic modulus of the elastic layer.

TABLE 4

| Evaluation rank | Evaluation criterion |
|---|---|
| AA | Four or more of the five subjects do not feel any change in hue. |
| A | Three of the five subjects do not feel any change in hue. |
| B | Two of the five subjects do not feel any change in hue. |
| C | Four or more of the five subjects feel a change in hue. |

Evaluation Method for Durability Test

A sheet passing durability test is performed with the color laser printer mounted with the fixing belt used in the image quality stability test by horizontally feeding A4 size recycled paper (the same paper as that used in the image quality stability test). The results of the evaluation are shown in accordance with judgement criteria shown in Table 5 below.

TABLE 5

| Evaluation rank | Evaluation criterion |
|---|---|
| A | No adhesive failure (interfacial peeling) between the base member and elastic layer of the fixing belt is observed at the point in time when the |

TABLE 5-continued

| Evaluation rank | Evaluation criterion |
|---|---|
| | number of passed sheets reaches 150,000. |
| C | An adhesive failure (interfacial peeling) between the base member and elastic layer of the fixing belt is observed before the number of passed sheets reaches 150,000. |

Examples 2-2 to 2-5, and Comparative Examples 2-1 and 2-2

The fixing belts 2 to 7 according to Examples 2-2 to 2-5, and Comparative Examples 2-1 and 2-2 were produced according to the methods described in Examples 1-2 to 1-5, and Comparative Examples 1-1 and 1-2.

The image quality stability test and the durability test were performed in the same manner as in Example 2-1 except that any one of those fixing belts was used.

The results of the evaluations of Examples 2-1 to 2-5, and Comparative Examples 2-1 and 2-2 are shown in Table 6 below.

TABLE 6

| | Fixing belt No. | Image quality stability test | Durability test |
|---|---|---|---|
| Example | 2-1 | 1 | A | A |
| | 2-2 | 2 | A | A |
| | 2-3 | 3 | AA | A |
| | 2-4 | 4 | A | A |
| | 2-5 | 5 | AA | A |
| Comparative | 2-1 | 6 | AA | C |
| Example | 2-2 | 7 | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-115844, filed Jun. 4, 2014, and Japanese Patent Application No. 2015-108820, filed May 28, 2015 which are hereby incorporated by reference herein in their entirety.

What is claimed is:

1. A fixing member for electrophotography, comprising:
a base member;
an elastic layer containing a cured silicone rubber on the base member; and
a surface layer on the elastic layer,
wherein:
the elastic layer further contains a carbon nanotube;
when an elastic modulus of the elastic layer at 50° C. is defined as E50 and an elastic modulus of the elastic layer at 200° C. is defined as E200, a ratio E200/E50 is from 0.5 to less than 1.0;
a peel adhesive strength between the elastic layer and the base member is from 3.0 N/cm to 20.0 N/cm; and
the elastic layer undergoes a cohesive failure in a peel test from the base member.

2. The fixing member according to claim 1, being a fixing belt having a belt shape, wherein the elastic layer has a thickness of 100 μm to 500 μm.

3. The fixing member according to claim 1, being a fixing roller having a roller shape, wherein the elastic layer has a thickness of 300 μm to 10 mm.

4. The fixing member according to claim 1, wherein:
the elastic layer is formed by curing an addition-curable silicone mixture on the base member; and
the addition-curable silicone mixture contains:
a first silicone compound having, on a side chain thereof, an unsaturated aliphatic group bonded to a silicon atom,
a second silicone compound having a hydrogen atom bonded to a silicon atom,
a third silicone compound having, at a terminal thereof, an unsaturated aliphatic group bonded to a silicon atom, and
a carbon nanotube.

5. The fixing member according to claim 4, wherein the first silicone compound has a structure represented by formula (A):

wherein, in the formula (A), $R_1$ represents a monovalent unsubstituted or substituted hydrocarbon group free of an unsaturated aliphatic group, $R_2$ represents an unsaturated aliphatic group, m represents an integer of 0 or more, and n represents an integer of 3 or more.

6. The fixing member according to claim 5, wherein, in the formula (A), $R_2$ represents a group selected from the group consisting of a vinyl group, an allyl group, a 3-butenyl group, a 4-pentenyl group, and a 5-hexenyl group.

7. The fixing member according to claim 4, wherein the third silicone compound has a structure represented by formula (B):

wherein, in the formula (B), $R_1$ represents a monovalent unsubstituted or substituted hydrocarbon group free of an unsaturated aliphatic group, $R_2$ represents an unsaturated aliphatic group, and n represents a positive integer.

8. The fixing member according to claim 7, wherein, in the formula (B), n is from 200 to 1,000.

9. A method of manufacturing the fixing member of claim 1, the method comprising curing a layer of an addition-curable silicone mixture on a base member, the addition-curable silicone mixture containing:
a first silicone compound having, on a side chain thereof, an unsaturated aliphatic group bonded to a silicon atom;
a second silicone compound having a hydrogen atom bonded to a silicon atom;

a third silicone compound having, at a terminal thereof, an unsaturated aliphatic group bonded to a silicon atom; and a carbon nanotube.

10. The method of manufacturing the fixing member according to claim 9, wherein the first silicone compound has a structure represented by formula (A):

wherein, in the formula (A), $R_1$ represents a monovalent unsubstituted or substituted hydrocarbon group free of an unsaturated aliphatic group, $R_2$ represents an unsaturated aliphatic group, m represents an integer of 0 or more, and n represents an integer of 3 or more.

11. The method of manufacturing the fixing member according to claim 10, wherein, in the formula (A), $R_2$ represents a group selected from the group consisting of a vinyl group, an allyl group, a 3-butenyl group, a 4-pentenyl group, and a 5-hexenyl group.

12. The method of manufacturing the fixing member according to claim 9, wherein the third silicone compound has a structure represented by formula (B):

wherein, in the formula (B), $R_1$ represents a monovalent unsubstituted or substituted hydrocarbon group free of an unsaturated aliphatic group, $R_2$ represents an unsaturated aliphatic group, and n represents a positive integer.

13. The method of manufacturing the fixing member according to claim 12, wherein, in the formula (B), n is 200 to 1,000.

14. A fixing device, which is configured to fix an unfixed toner image formed on a recording medium onto the recording medium, the fixing device comprising:

the fixing member of claim 1; and a pressure member arranged so as to face the fixing member, the pressure member forming a fixing nip with the fixing member.

15. An electrophotographic image-forming apparatus, comprising:

an electrophotographic photosensitive member;

a charging device configured to charge a surface of the electrophotographic photosensitive member;

an exposing unit configured to form an electrostatic latent image on the electrophotographic photosensitive member;

an intermediate transfer member; and the fixing device of claim 14.

* * * * *